No. 754,143. PATENTED MAR. 8, 1904.
T. R. JOHNSON.
ILLUMINATED KALEIDOSCOPE.
APPLICATION FILED SEPT. 17, 1903.
NO MODEL. 2 SHEETS—SHEET 2.
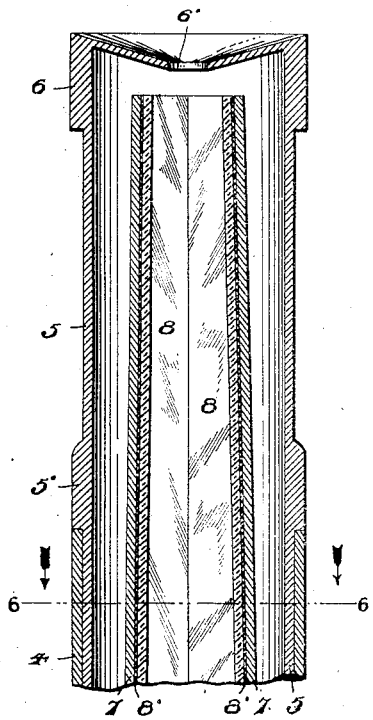
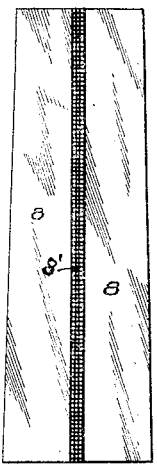
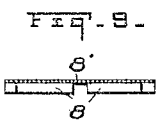
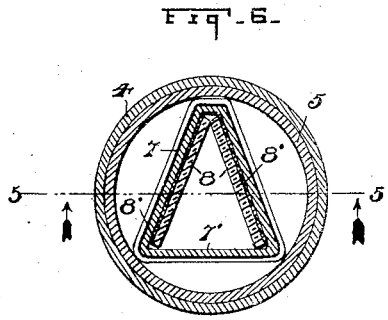
WITNESSES: INVENTOR
Thomas R. Johnson
By Jno. Nesbit
Atty No. 754,143. Patented March 8, 1904.

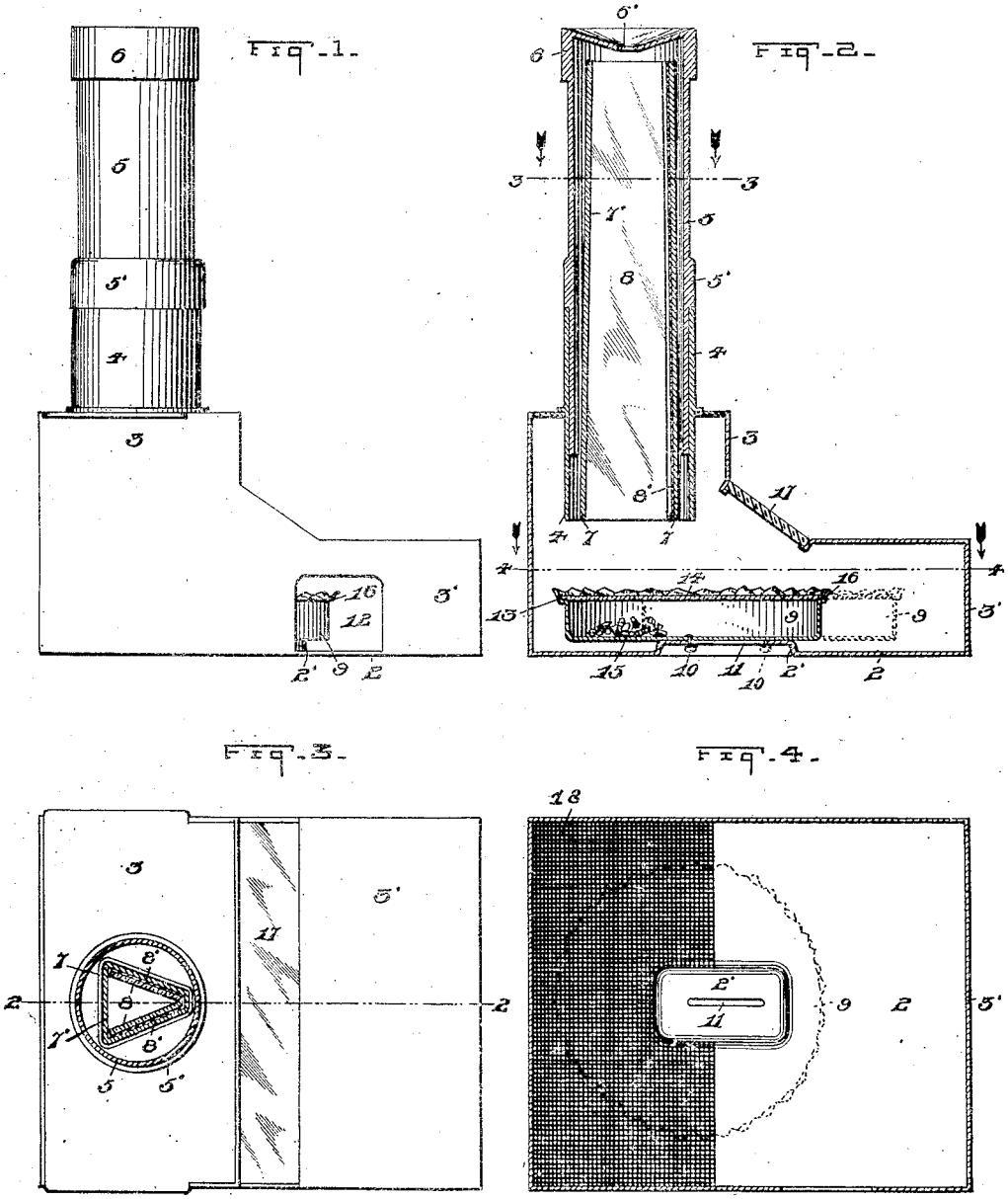

UNITED STATES PATENT OFFICE.

THOMAS R. JOHNSON, OF JEANNETTE, PENNSYLVANIA.

ILLUMINATED KALEIDOSCOPE.

SPECIFICATION forming part of Letters Patent No. 754,143, dated March 8, 1904.

Application filed September 17, 1903. Serial No. 173,511. (No model.)

*To all whom it may concern:*

Be it known that I, THOMAS R. JOHNSON, a citizen of the United States, residing at Jeannette, in the county of Westmoreland and State of Pennsylvania, have invented certain new and useful Improvements in Illuminated Kaleidoscopes, of which the following is a specification, reference being had therein to the accompanying drawings.

This invention relates to an illuminated kaleidoscope; and one object is to provide an instrument wherein constantly-changing figures may be produced in a great variety of sizes and shapes or outlines at the pleasure of the observer.

A further object is to provide for exposing any figure as long as may be desired; also, for exposing in rotation a series of views which may be repeated as often as the operator may wish.

Still a further object is to provide novel means for illuminating the figures, whereby strikingly beautiful effects are produced not heretofore obtainable.

The invention embodies an improved mounting for the mirrors and means for moving the same with relation to the object-holder; an improved case, together with novel means for admitting light thereto; objects of novel formation and an improved object-holder, and means for moving the object-holder laterally with relation to the mirrors.

In the accompanying drawings, Figure 1 is a side elevation of a kaleidoscope embodying my improvements; and Fig. 2 is a top plan view of the same, the observation-tube being shown in section on line 2 2 of Fig. 3. Fig. 3 is a vertical section on line 3 3 of Fig. 2. Fig. 4 is a sectional plan view on line 4 4 of Fig. 2, the object-holder being shown in dotted lines. Fig. 5 is a vertical section of the observation-tube on line 5 5 of Fig. 6, and Fig. 6 is a cross-section on line 6 6 of Fig. 5. Fig. 7 is a view of the mirror-holding tube. Figs. 8 and 9 are detail views of the mirrors. Fig. 10 is an enlarged view of the object-holder, and Fig. 11 is a detail view of several of the movable objects.

Referring to the drawings, the kaleidoscope-case is of box form, with its rear part 3 higher than front portion 3'. Secured in the top of portion 3 is the vertical tubular support 4, in which is rotatably mounted the observation-tube 5, open at the lower end and at the top provided with cap 6, formed with the central sight-aperture 6'. Annular shoulder 5' on tube 5 serves to rotatably support the latter on the upper end of tube 4.

Tightly fitting within tube 5 is the three-sided tube 7, having on two sides thereof the mirrors 8, which are thus disposed at an angle to each other, as is usual in this class of devices. The surface 7' of tube 7, exposed between the mirrors, is preferably dark in color or black, as I obtain the best results by excluding all light-colored surfaces from the mirror-tube and by admitting the light-rays at the lower end only. The two pieces of glass comprising the mirrors are preferably mounted on a piece of black fabric 8', which affords the necessary backing and holds the same together in hinge fashion. Tube 7 and mirrors 8 are tapered slightly, so that the latter while readily removable are securely held against accidental displacement.

Object-holder 9 is rotatably and slidably mounted within the case, being provided with central pivot 10, which depends through slot 11 in raised portion 2' of case-bottom 2, said raised portion forming a cavity for the lower extremity of the pivot, which is thus conveniently accessible for sliding the object-holder either toward or from the mirrors. In one side of the case is opening 12, through which the operator may insert his finger for rotating the holder. The object-holder is preferably circular and dish-shaped and is formed with annular internal shoulder 13, which supports glass cover 14 for confining the movable objects 15. At the top edge of the holder is rim 16, which is cut or indented to form projections 16' of various irregular shapes, which may be illuminated or decorated, as by painting, covering with paper or tin-foil of different colors, &c. The movable objects 15 may be formed of bits of colored material—such as glass, paper, and the like—though I prefer paper, as it may be twisted, crumpled, or crushed into wads or lumps of many different shapes. The bottom 9' of the holder is decorated by painting or by pasting bits of paper thereon, so that it combines with the movable objects in always providing a field for the formation of views or figures, so that even when the objects are bunched and turned out of line with the mirrors the permanently-decorated bottom provides for an attractive figure.

For admitting light I prefer to arrange a panel of glass 17 in the front or top of the case, which is immediately above the object-holder and disposed at such an angle as to direct a strong light immediately below the mirrors. Cathedral or other opaque or partially opaque glass is preferred, as it transmits ample light without disclosing the interior arrangement of the instrument, thereby preserving the mystery surrounding these devices entertained by those not familiar with their construction.

In operation with the object-holder in rearward position, as in full lines in Fig. 2, it occupies the entire field of vision, and the successive views are created entirely by the contents thereof, which may be the movable figures, the decorated bottom, or both, and by rotating the object-holder a constant change is effected. When holding the instrument level, or substantially so, the objects remain quiescent, creating a cycle of views which may be repeated as often as the observer may wish. By holding the instrument at an incline while turning the holder the objects are caused to tumble and produce views in endless profusion. By sliding the object-holder away from the mirrors or in direction indicated by dotted lines in Fig. 2 the rim 16 is brought into the line of vision, and the brightly-colored irregular projections thereof provide the views or figures with illuminated jewel-like edges or borders of endless variety and great beauty. With a portion only of the field occupied by the object-holder, as is the case when the latter is moved outward, floor 2 of the case comes into view, and it is characteristic of the invention to blacken the same, particularly the bottom of portion 3, as indicated at 18, thus giving a black velvet-like background to all such views, which greatly augments their rich effect. This black background also tends to obliterate the lines radiating from the apicillary line, and the same is true of the decorated bottom of the object-support, for whether the background be wholly or only partially obscured a view is always presented with said lines far less conspicuous than otherwise. With the laterally-movable object-holder the objects may be caused to cover the entire field of vision and form views of maximum size, or the object-holder may be so adjusted as to place in view only a very small portion of rim 16, which when the object-holder is in motion produces exquisite jewel-like figures the richness and beauty of which are fully brought out by the black background. An intermediate adjustment of the holder produces views of medium size, each having the illuminated edge afforded by rim 16, as before explained, and each having the surrounding black background, which causes the figures to stand out in bold relief. By rotating tube 5 in tubular support 4 the apicillary line of the mirrors is caused to shift in a circular path, and the exposed object is depicted in a cycle of views or figures. The effects thus produced are particularly striking when a portion of the black background is exposed, as some figures then show solid surrounded by black, while a different adjustment of the mirrors forms the same field into figures which inclose a black center. Other adjustments of the mirrors over the same field create crosses, squares, and various other designs, all of which have brilliantly-illuminated edges or borders. In addition to the above-mentioned operations the mirrors and object-holder may be rotated at the same time, with the center of the object-holder fixed or moving at the pleasure of the operator.

It is characteristic of my improved kaleidoscope that views or figures obtained by any of the various adjustments, save when the instrument is so held as to keep the objects in motion, may be retained indefinitely or repeated as often as desired, thus giving the observer ample time to copy or sketch any design that he may desire to preserve. Thus the instrument may be of great service to designers and others in quest of novel figures and at the same time is a source of instructive entertainment.

I claim as my invention—

1. In a kaleidoscope, mirrors, a case, an object-holder slidable in the case transverse the line of vision and open at the top for the admission of light, and means for rotating the slidable holder.

2. In a kaleidoscope, revoluble mirrors, and a revoluble object-holder.

3. In a kaleidoscope, revoluble mirrors, and a revoluble object-holder slidable transverse the line of vision.

4. In a kaleidoscope, a holder, and two mirrors arranged at an angle therein with a black or dark-colored surface exposed between the mirrors.

5. In a kaleidoscope, a three-sided tube having one side black or dark colored, and mirrors fitting the other two sides thereof.

6. A movable object-support for kaleidoscopes having an edge of irregular shape.

7. A movable object-support for kaleidoscopes having a decorated edge of irregular shape.

8. A circular and rotatable object-support for kaleidoscopes having a decorated edge of irregular shape.

9. A dish-shaped object-holder for kaleidoscopes having a decorated object-supporting surface and a decorated edge of irregular form.

10. In a kaleidoscope, a case formed with a side opening for the purpose described, mirrors; and an object-holder.

11. In a kaleidoscope, a case having a black or dark-colored surface beneath the mirrors, an object-support, and mirrors.

12. In a kaleidoscope, a case having a black or dark-colored bottom-surface, mirrors, and an object-holder movable between said dark-colored surface and the mirrors.

13. In a kaleidoscope, a case having a black or dark-colored bottom-surface, mirrors, and an object-support movable between said surface and the mirrors and provided with a decorated edge of irregular shape.

14. In a kaleidoscope, a case, an observation-tube projecting from the upper portion of the case, a light-admitting panel in the upper portion of the case, and an object-holder within the case and below the tube and panel.

15. In a kaleidoscope, a case, an observation-tube, an object-holder within the case, and a light-admitting panel in the upper portion of the case arranged at an angle to the object-support.

16. In a kaleidoscope, a case having a raised rear portion, a glass panel in the top of the case at the juncture of the front and rear portions, an observation-tube depending through said rear portion, and an object-holder within the case.

17. In a kaleidoscope, a case having its rear portion closed and provided with a black bottom, an observation-tube and a glass panel in the upper portion of the case, and an object-support within the case and movable over the black bottom-surface thereof.

In testimony whereof I affix my signature in presence of two witnesses.

THOMAS R. JOHNSON.

Witnesses:
HENRY SMITH,
FRED. R. JOHNSON.